No. 786,659.

PATENTED APR. 4, 1905.

E. MILLER.
GLASS MOLDING MACHINE.
APPLICATION FILED JAN. 5, 1905.

Witnesses
Benj. Finckel
Oda Eckstein

Inventor
Edward Miller
by Finckel & Finckel
his Attorneys

No. 786,659.

Patented April 4, 1905.

UNITED STATES PATENT OFFICE.

EDWARD MILLER, OF COLUMBUS, OHIO.

GLASS-MOLDING MACHINE.

SPECIFICATION forming part of Letters Patent No. 786,659, dated April 4, 1905.

Application filed January 5, 1905. Serial No. 239,772.

*To all whom it may concern:*

Be it known that I, EDWARD MILLER, a citizen of the United States, residing at Columbus, in the county of Franklin and State of Ohio, have invented certain new and useful Improvements in Glass-Molding Machines; and I do hereby declare the following to be a full, clear, and exact description of the invention, such as will enable others skilled in the art to which it appertains to make and use the same.

In the molds of modern glass-molding machines the hot glass is first subjected to the pressure of a plunger to form the neck of the article and to give the glass a preliminary hollow form prior to the blowing operation. For this purpose there is employed a primary bottom for the mold, which bottom is moved up into the cavity of the mold to receive the hot glass prior to the descent of the plunger. After the pressing operation the primary bottom is withdrawn and a horizontally-sliding secondary bottom substituted to complete the cavity for the blowing operation. Prior to my present invention the preliminary molding of the glass was not such as to permit of an even distribution of the glass around the sides and corners of the molding-cavity when the glass was subjected to the blowing operation.

The object of the present invention, therefore, is to provide a cavity of such form that the glass when blown shall be evenly distributed about the sides and corners of the cavity; and the invention consists in the construction hereinafter described and claimed.

Figure 1:
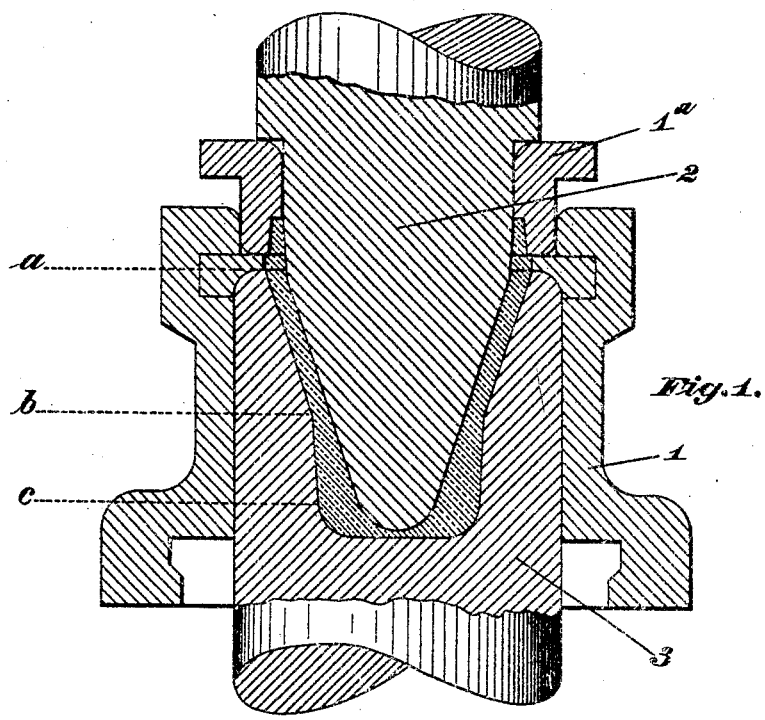
Figure 2:
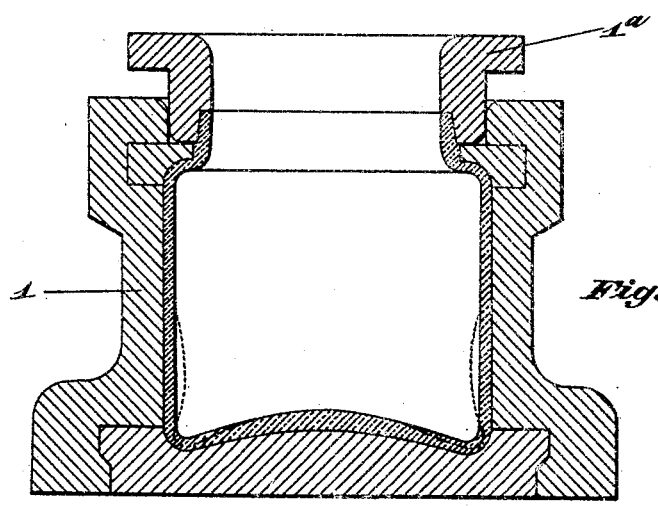

In the accompanying drawings, Figure 1 illustrates a central vertical sectional view of a mold, showing the primary bottom in position therein with the plunger down and the glass as pressed thereby. Fig. 2 is a similar view showing the plunger removed, the secondary bottom in place, and the glass after it has been subjected to the blowing operation.

In the two views, 1 designates the mold-body, which may be constructed as usual— that is, of two sections hinged together.

$1^a$ designates a neck-ring supplementing the mold proper for giving shape to the neck of the jar or bottle.

2 designates the plunger, and 3 the primary bottom. The plunger 2 is of the usual conical form at the lower end; but the walls of the cavity in the primary bottom have a double taper—that is to say, the cavity of a rapid taper from the horizontal plane $a$ to the horizontal plane $b$ and of a slight taper from the plane $b$ to the plane $c$ at the bottom of the cavity. The taper of the cavity of the primary bottom from the plane $a$ to the plane $b$ is substantially the same as that of the plunger. The cavity formed by the plunger and primary bottom, therefore, as seen in Fig. 1, is of enlarged thickness or diameter between the lower end of the plunger and the bottom of the primary bottom. This construction provides room for a corresponding quantity of glass, so that when the glass is subjected to the blowing operation it is spread in even quantities toward the lower corners of the jar or bottle, making the thickness of the glass at such corners correspond substantially with the thickness of the glass at the contiguous sides, as illustrated in Fig. 2. In Fig. 2 I have shown by dotted lines the manner in which the glass is liable to be distributed when blown where the primary bottom and plunger are constructed as heretofore. These dotted lines indicate an extreme thinness at the corners of the bottle or jar and an unnecessary thickening of the wall of glass above the corners. To permit a withdrawal of the plunger and to aid in pressing the glass outward toward the neck of the mold, the plunger is of a slight taper for a short distance above its main taper.

What I claim, and desire to secure by Letters Patent, is—

1. In a glass-molding machine, the combination with a mold-body of a primary bottom therefor having a cavity and a plunger to coöperate therewith, the said cavity and plunger both having tapering sides, the said tapering sides being substantially parallel to each other in their upper portions but of divergent taper in their lower portions, substantially as shown and described.

2. In a glass-molding machine the combination with a mold-body of a primary bottom therefor, having a cavity provided with a double taper and a plunger coöperating with said primary bottom having a substantially uniform taper.

In testimony whereof I affix my signature in presence of two witnesses.

EDWARD MILLER.

Witnesses:
 OLIN J. ROSS,
 BENJ. FINCKEL.